United States Patent Office

Re. 27,820
Reissued Nov. 27, 1973

27,820

WATER ABSORBENT WEB AND ITS PRODUCTION

Alfred Politzer, Fairview Park, Galib-Bey Atam Alibeckoff, Lakewood, and Pao-Chi Wang, Bay Village, Ohio, assignors to Nylonge Corporation, Cleveland, Ohio No Drawing. Original No. 3,657,035, dated Apr. 18, 1972, Ser. No. 844,153, July 23, 1969. Application for reissue Aug. 29, 1972, Ser. No. 284,666
Int. Cl. B32b *5/32, 23/06, 31/06*
U.S. Cl. 156—78 11 Claims

Matter enclosed in heavy brackets [ ] appears in the original patent but forms no part of this reissue specification; matter printed in italics indicates the additions made by reissue.

ABSTRACT OF THE DISCLOSURE

A web which is soft and rapidly and highly water absorbent when both wet and dry is produced by sandwiching under pressure a layer of cellulose pulp fiber reinforced, foamed viscose between thin fleeces of unbonded cotton fibers and regenerating the viscose cellulose. The product is a reticulated matrix of regenerated cellulose and dispersed pulp fibers with the fleece fibers embedded in the opposite faces of the regenerated cellulose layer.

*CROSS REFERENCE TO RELATED APPLICATIONS*

*This application is a reissue of U.S. Pat. No. 3,657,035.*

BACKGROUND OF THE INVENTION

The present invention relates generally to improvements in wiping, washing and cleaning articles and it relates particularly to an improved soft, highly water absorbent, web or cloth and to an improved method for producing the same.

Wiping and cleaning webs are broadly of two types, the paper towel or napkin type which is generally formed of randomly oriented wood cellulose fibers in a relatively compact non-woven state produced on conventional paper producing equipment and the woven or knitted cloth type which is conventionally formed of cotton fibers. The conventional wiping and cleaning webs possess numerous drawbacks and disadvantages which characterize the particular type of web. Thus, the woven or knitted cotton cloth is generally coarse and commonly not lint free and are too expensive to be considered disposable so that for economic reasons they must be regularly laundered. The paper towel, on the other hand, is likewise coarse, of low water absorption, and slow water take-up and very weak both in a dry and wet state. These webs have been treated with polymeric resins to increase their wet strength but such treatment increases the cost of the product and reduces its water absorption qualities and increases its courseness. It is thus clear tht the conventional wiping and cleaning webs leave something to be desired and generally represent a compromise.

Numerous structures have heretofore been proposed in attempts to avoid the disadvantages of the conventional cloth and paper webs but these structures fail to remedy the important defects thereof. A laminate consisting of two or more tissue paper webs cemented together by regenerated cellulose derived from intermediate layers of foamed viscose has been described but this product is relatively had and stiff, particularly when dry, and possesses a slow water takeup. It has also been suggested to laminate carded cotton fleeces with resin foams but the resulting product is of low water absorption and permeability. Various other composite products have been proposed which do not satisfy the long felt need for an inexpensive web of high absorption and rapid take-up of water, which web is soft and strong when both wet and dry.

SUMMARY OF THE INVENTION

It is a principal object of the present invention to provide an improved cleaning and wiping article and an improved method of producing the same.

Another object of the present invention is to provide an improved cleaning and wiping cloth and an improved method of producing the same. Still another object of the present invention is to provide an improved disposable highly water absorbent cleaning and wiping cloth which is very soft and possesses rapid water take-up and great strength both in a wet and dry state.

A further object of the present invention is to provide an article of the above nature characterized by its low cost, versatility, convenience of use and attractive appearance.

The above and other objects of the present invention will become apparent from a reading of the following description.

It has been discovered that a laminate of a reticulated regenerated cellulose layer and a layer of independently movable cellulose fibers in which the cellulose fibers at the layer interface are imbedded in the regenerated cellulose layer possesses numerous highly desirable characteristics and features. Among these are a high water absorption capacity, a rapid water take-up and great softness when wet and dry and a very high wet and dry strength. The improved article also possesses a high abrasion and wear resistance, is lint free, inexpensive, so as to be economically disposable, and possesses numerous other advantages.

In a sense the present invention contemplates the provision of a highly water absorbent web, sheet or slab material which is soft, pliable and of high strength when both wet and dry and comprises a reticulated matrix of regenerated cellulose, preferably containing cellulose pulp fibers, sandwiched between opposite layers of non-woven cellulose fibers embedded in the opposite faces of the regenerated cellulose matrix.

The web or sheet is of a thickness of 0.15 millimeter to 5 millimeters or more with the weight of each of the outer fiber layers being between 4 to 60 grams per square meter and the outer fiber layers constitute between 2 percent and 85 percent by weight of the dry product. The regenerated cellulose constitutes at least 15 percent by weight of the matrix, which may contain cellulose reinforcing fibers, and advantageously in excess of 20 percent thereof and preferably constitutes between 15 percent and 95 percent by weight of the dry end product. Where the matrix contains only a small amount of reinforcing fibers the reticulated matrix may be to a large extent defined by a highly porous or reticulated structure and where a large proportion of reinforcing fibers are employed the matrix may be defined by a three dimensional fiber network bonded by the regenerated cellulose.

The reinforcing fibers are advantageously of relatively small staple length preferably averaging between 1.5 mm. and 4 mm., although longer average staple lengths may be employed whereas the outre fiber layers are advantageously of relatively large staple length preferably averaging between 10 and 60 mm. Advantageously the matrix reinforcing fibers are derived from a cellulose pulp, for example a wood pulp, while the outer layer fibers are advantageously cotton or rayon fibers which are for the most part randomly oriented and preferably freely and three dimensionally and independently interrelated such as of the nature of a fleece or web of randomly oriented fibers, for example of the nature produced by the Rando web forming process in the known manner.

The improved method for producing the present product comprises the steps of forming a foamed preferably fiber reinforced viscose, sandwiching a layer of the foamed viscose between opposite cellulose fiber layers, compressing the laminate and thereafter regenerating the cellulose in the viscose. The foaming is advantageously primarily effected by admixing the viscose, reinforcing fibers and a surfactant and whipping the resultant mixture to incorporate and disperse air therein and reduce its specific gravity which is initially about 1.3, to between 0.6 and 0.15. It has been found that the viscose should possess a high alkalinity as compared to the normal alkalinity of viscose, that is it should possess a ratio of sodium hydroxide to viscose cellulose exceeding 0.9:1.0, and an alkalinity corresponding to a ratio of sodium hydroxide to the viscose cellulose and reinforcing cellulose fibers exceeding 0.7:10. The viscose cellulose is preferably 2 to 10 percent by weight of the viscose and the alkalinity is between 1.8 percent and 25 percent. The high alkalinity permits the production of a product with a high proportion of regenerated cellulose possessing great softness and pliability both wet and dry.

The laminate of outer fibrous webs and inner viscose foam may be compressed by passing it between suitably biased squeeze rolls or between belts or webs which are squeezed together. The compressed laminate is then passed through a suitable coagulating and regenerating bath, for example, an aqueous solution containing 10 to 28 percent sodium sulfate and 0.5 to 2.5 percent sulphuric acid, advantageously at an elevated temperature, preferably between 90° and 100° C. to coagulate and regenerate the viscose and the resulting product is then washed, bleached and dried. It has been found that the use of high bath temperature results not only in a greater coagulation and regeneration speed but also in a softer product of reduced density and other desirable properties.

Where a relatively thick product is desired it is advantageous to admix with the foamed viscose sodium sulfate decahydrate crystals. These crystals may have an average size up to about ⅛ inch and may constitute up to 8 times the weight of the viscose and the reinforcing fibers contained therein. Moreover, the improved product may contain more thant wo fibrous layers, for example, three or more, and such product is produced by forming a laminate of alternate layers of fibrous webs and viscose foam with the fibrous webs forming the outer layers as well as one or more inner layers and then proceeding in the manner described above.

A highly advantageous method of forming the laminate of fibrous outer layers and viscose foam matrix layers is to deposit a first layer of randomly oriented fibers onto a substrate by means of a Rondo web forming apparatus, deposit a layer of the foamed viscose mixture onto the first layer and deposit by means of the Rondo machine a second layer of randomly oriented cellulose fibers onto the viscose foam layer. The substrate may be a perforate belt or screen and the laminate is compressed while being advanced on the substrate belt by means of an upper superimposed belt or pressure roller. The foamed viscose layer is of a thickness depending on that of the desired end product.

The improved product of the present invention possesses an extremely fast water take-up, a very high water retention, is highly porous, and is soft and strong in both a dry and wet state and is lint free and highly abrasion and wear resistant. It is boilable and launderable, is easily disinfected and sterilized and may be dyed, printed, sewn, glued, cemented and otherwise treated and handled. While it is highly suitable as a wiping and wash cloth it possesses numerous other applications. It is highly useful for clothing, bed linens, surgical pads, filters, and other applications and may be impregnated with many active materials.

DESCRIPTION OF THE PREFERRED EMBODIMENTS

The following examples are given merely by way of illustration of the present invention.

EXAMPLE I

There was prepared in the conventional manner viscose containing 4.25 percent cellulose. 15.8 percent sodium hydroxide and 1.85 percent sulphur originating in the $CS_2$ employed in the viscose preparation. The viscose had a viscosity of 8 seconds as determined in the known manner with a ¼ inch steel ball and a 20 centimenter fall. Two percent by weight of the surfactant dienthanol amine of capric acid (Nopco GLN) was admixed with the viscose.

Finely divided cellulose pulp fibers are produced by disintegrating in a hammer mill a 91 percent alpha cellulose bleached Kraft wood pulp (Buckeye Cellulose E-1). The cellulose fibers possessed the following screen analysis.

| | |
|---|---|
| TE+14 | TF 48.4% |
| TE+28 | TF 33.4% |
| TE+48 | TF 9.9% |
| TE+100 | TF 4.7% |
| TE−100 | TF 3.6% |

Ten pounds of the surfactant containing viscose was mixed in a kneader for 15 minutes to partially foam and increase the volume of the viscose. Thereafter, 1.25 pounds of the disintegrated pulp was added to the viscose and the mixing continued for another 45 minutes during which the main foaming occurred and the foamed mass reached a specific gravity of 0.34.

A first fleece of randomly oriented loose cotton fibers was deposited in the known manner on a Teflon coated screen, the fleece having a weight of 15 grams per square meter. A layer of the foamed viscose mass of a thickness corresponding to about 600 grams per square meter was uniformly deposited on the first fleece and a second fleece, similar to the first fleece, was then deposited on the viscose mass layer. A second Teflon coated screen was deposited on the viscose fleece laminate and the assembly was advanced between a pair of rubber coated squeeze rollers at a pressure of about 30 pounds per square inch.

The squeezed screen and laminate assembly was then directed into a coagulation and regeneration bath at 100° C. and containing 2 percent sulfuric acid and 26 percent sodium sulfate. After immersion in the bath for three minutes the assembly is removed and the laminate separated from the screens and subjected to a suitable after treatment including the steps of desulfurizing, bleaching, antichlor treatment, washing and drying.

The resulting product was soft when wet or dry and possessed a very high wet and dry strength and consisted of 18.7 percent regenerated cellulose, 56.3 pulp fibers, 25 percent cotton fibers and had a weight of 120 grams per square meter.

EXAMPLE II

The procedure of Example I was followed in which the viscose contained 6.2 percent cellulose, 7.3 percent sodium hydroxide and 2.7 percent sulfur and had a viscosity of 27 seconds. The foamed mass contained 2.6 percent of the surfactant and 0.22 pound of the disintegrated pulp fibers in ten pounds of the viscose. The outer cotton webs and the viscose mass layer were compressed under four pounds per square inch pressure. In all other respects the method of Example I was followed.

The resulting products contained 31.5 percent of the outer cotton webs, 51.5 percent regenerated cellulose and 17.0 percent pulp fibers and weighed 95 grams per square meter. It had a wet strength of 8.8 pounds per inch, a water absorption of 1840 percent and was soft and supple in both a wet and dry state.

While there have been described preferred embodiments of the present invention it is apparent that numerous alterations, omissions and additions may be made without departing from the spirit thereof.

We claim:

1. The method of producing a water absorbent material comprising forming a viscose foam having a ratio of sodium hydroxide to cellulose exceeding 0.9:1.0, sandwiching a layer of said viscose foam under pressure between two layers of randomly distributed cellulose fibers having an average staple length exceeding 10 mm. and thereafter regenerating the cellulose in said viscose.

2. The method of producing a soft water absorbent product comprising forming a foamed viscose having an alkalinity corresponding to a ratio of sodium hydroxide to the cellulose dissolved in said viscose exceeding 0.9:1.0, laminating a layer of said foamed viscose between opposing layers of fibers and regenerating the cellulose in said viscose.

3. The method of claim 2 wherein said viscose foam contains a surfactant and reinforcing fibers dispersed and undissolved in said viscose.

4. The method of claim 3 wherein said foamed mixture is produced by whipping air into a mixture of said viscose, reinforcing fibers and surfactant.

5. The method of claim 3 wherein said cellulose is regenerated by exposing said laminate to an acid bath at an elevated temperature.

6. The method of claim 3 wherein said foamed mixture has a specific gravity of 0.6 to 0.15.

7. The method of claim 3 comprising depositing a first layer of randomly oriented cellulose fibers on a substrate, depositing a layer of said foamed mixture on said first layer, depositing a second layer of randomly oriented cellulose fibers on said foamed mixture layer, and then compressing said layers.

*8. The method of producing a soft water absorbent product comprising forming a foamed viscose having an alkalinity corresponding to a ratio of sodium hydroxide to the cellulose dissolved in said viscose exceeding 0.9:1.0, applying a layer of said foamed viscose to a fibrous layer and regenerating the cellulose in said viscose.*

*9. The method of claim 8 wherein said cellulose is regenerated by exposing said foamed viscose applied to said fibrous layer to an acid bath at an elevated temperature.*

*10. The method of claim 8 wherein said viscose foam contains reinforcing fibers dispersed and undissolved in said foamed viscose.*

*11. The method of claim 8 wherein said foamed mixture has a specific gravity of 0.6 to 0.15.*

References Cited

The following references, cited by the Examiner, are of record in the patented file of this patent or the original patent.

UNITED STATES PATENTS

| | | | |
|---|---|---|---|
| 2,069,771 | 2/1937 | Pascoe et al. | 162—164 X |
| 2,076,594 | 4/1937 | Richter | 260—217 |
| 2,079,993 | 5/1937 | Hans | 260—217 X |
| 2,104,057 | 1/1938 | Scott | 161—269 X |
| 2,182,188 | 12/1939 | Walter | 161—269 X |
| 2,257,576 | 9/1941 | Robinson | 161—269 |
| 2,744,292 | 5/1956 | Schlosser et al. | 161—269 X |
| 3,171,773 | 3/1965 | Ester et al. | 161—269 X |
| 3,366,532 | 1/1968 | Maskey et al. | 161—269 X |
| 3,546,060 | 12/1970 | Hoppe et al. | 161—159 X |
| 3,578,544 | 5/1971 | Thorsrud | 156—78 X |
| 3,580,253 | 5/1971 | Bernardin | 161—156 X |
| 3,669,823 | 6/1972 | Wood | 161—156 X |

HAROLD ANSHER, Primary Examiner

U.S. Cl. X.R.

117—144; 156—62.4, 79, 279, 280; 161—156, 160, 269; 260—218